United States Patent [19]

Sugawara et al.

[11] Patent Number: 5,538,578
[45] Date of Patent: Jul. 23, 1996

[54] METHOD FOR JOINING END PORTIONS OF WEATHERSTRIP AND APPARATUS FOR FORMING JOINING MEMBER THEREFOR

[75] Inventors: Tomio Sugawara; Hisashi Odawara; Toshikazu Kaneko; Hiroaki Shimada; Shouji Inoue, all of Chiba, Japan

[73] Assignee: Kinugawa Rubber Ind. Co., Ltd., Chiba, Japan

[21] Appl. No.: 144,283

[22] Filed: Oct. 28, 1993

[30] Foreign Application Priority Data

Oct. 30, 1992 [JP] Japan .................... 4-292815
Jul. 23, 1993 [JP] Japan .................... 5-181788
Sep. 28, 1993 [JP] Japan .................... 5-240833

[51] Int. Cl.$^6$ .......... B29C 33/42; B29C 45/14; B29C 45/64; F16J 15/14
[52] U.S. Cl. .......... 156/245; 156/157; 156/228; 156/502; 264/261; 264/277; 425/125; 425/DIG. 127; 49/498.1
[58] Field of Search .................... 264/261, 263, 264/259, 275, 277; 156/245, 157, 244.22, 228, 502; 425/117, 125, 129.1, DIG. 127; 49/498.1

[56] References Cited

U.S. PATENT DOCUMENTS

| | | | |
|---|---|---|---|
| 624,835 | 5/1899 | Malchow et al. | 264/259 X |
| 2,278,756 | 4/1942 | Wright | 156/228 |
| 2,571,259 | 10/1951 | Kusiak | 264/261 X |
| 2,582,022 | 1/1952 | Feldman et al. | 264/261 X |
| 2,637,073 | 5/1953 | Walther | 264/261 |
| 3,773,454 | 11/1973 | Horve et al. | 425/129.1 X |
| 4,470,786 | 9/1984 | Sano et al. | 425/125 |
| 4,854,079 | 8/1989 | Karibe et al. | 49/498.1 X |
| 4,986,947 | 1/1991 | Shigeki et al. | 264/250 |
| 5,035,937 | 7/1991 | Nozaki | 49/498.1 X |
| 5,127,193 | 7/1992 | Okada et al. | 49/498.1 X |
| 5,250,241 | 10/1993 | Iwasa et al. | 264/46.4 |
| 5,258,157 | 11/1993 | Nozaki et al. | 264/261 |

FOREIGN PATENT DOCUMENTS 60-16898 4/1985 Japan .
3258520 11/1991 Japan ............. B29C 45/36

Primary Examiner—Michael W. Ball
Assistant Examiner—Francis J. Lorin
Attorney, Agent, or Firm—Bachman & LaPointe

[57] ABSTRACT

A method of joining end portions of a weatherstrip consists of introducing the end portions to openings in a mold such that a seal portion of the weatherstrip is compressed substantially to the shape of a seal lip of the seal portion. The end portions are separated in the mold by a predetermined gap and a rubber material is injected into the gap for mutually bonding the end portions of the weatherstrip. Such a method of joining allows the weatherstrip to be installed on complexly shaped openings with no degradation of sealing characteristics over the perimeter covered by the weatherstrip. A molding apparatus for joining said end portions includes a clamping member for assuring correct positioning of a sealing edge of the weatherstrip.

20 Claims, 15 Drawing Sheets

METHOD FOR JOINING END PORTIONS OF WEATHERSTRIP AND APPARATUS FOR FORMING JOINING MEMBER THEREFOR

BACKGROUND OF THE INVENTION

1. Field of the Invention

The present invention relates generally to a method of joining end portions of weatherstripping. Particularly, the present invention is drawn to a method of joining end members of weatherstrips on an automotive vehicle. In a manner that is secure, simple, reliable and provides a pleasing appearance.

2. Description of the Prior Art

Weatherstrips are widely used as sealing members in automobiles. Around window and door frames for example, several different weatherstrips may be installed. Alternatively, a single weatherstrip may be used to encircle an opening to be sealed. Thus a problem arises in that there is a need to join end portions of the weatherstrip, or weatherstrips in a manner that is reliable and secure, while providing a well finished appearance.

One method of joining such end members of a weatherstrip has been proposed in Japanese Patent Application (First Publication) 3-258520. The disclosed therein is illustrated in FIG. 18. As may be seen, a weatherstrip 1 includes a base portion 2 of relatively hard rubber for engaging a portion of a door well, trunk rim, or the like, while a sealing portion 3 of substantially soft rubber faces in the direction to be sealed by closing of the door, trunk, etc. Two end portions 4, 5 of the weatherstrip 1 are arranged facing each other and a connecting portion 6 has end portions 6a, 6b thereof inserted into hollow end sections of the sealing portion 3 in order to effect joining of the ends 4, 5 of the weatherstrip 1. Then a molded joining member is formed over the connecting portion to suitably connect the end members of the weatherstrip 1.

However, application of such a joining method is complex and troublesome, and smooth fit and contiguity of the sealing portion may not be reliably obtained. Also, according to this method, a cut or break will appear at some point in the sealing portion 3 at which the join is present and thus efficiency of sealing is reduced and complexity and cost of installation is increased. In addition, the above method requires a length of the end portions to be joined to accommodate the connecting portion 6 and thus the joined portion of the weatherstrip 1 becomes long and impractical for openings or compartments which are small or complex in shape. Also, flexibility of the seal portion 3 is impaired by insertion of the connecting portion 6.

In addition, the inability of the above method to provide contiguity of the sealing portion 3 may degrade sealing performance and allow moisture or air through the weatherstrip even if the sealed compartment is closed.

Further, since the connecting portion 6 must be installed before forming a joining member thereover by molding processing, the number of parts is high and the process requires a number of steps, which tend to raise the cost of effecting such joining.

Thus it has been required to provide a method of joining end portions of a weatherstrip which is simple and secure. It has also been required to provide a method for joining such end portions which may be installed in a small space and which provides contiguity of a sealing surface of the weatherstrip.

SUMMARY OF THE INVENTION

It is therefore a principal object of the present invention to overcome the drawbacks of the prior art.

It is a further object of the present invention to provide a method of joining end portions of a weatherstrip which is simple to implement while being secure and low in cost.

It is a further object of the invention to provide such a method for joining end portions of a weatherstrip which may be installed in a small space and which provides contiguity of a sealing surface of the weatherstrip.

In order to accomplish the aforementioned and other objects, a method of joining end members of a weatherstrip having a welt portion for installation thereof and a sealing portion, including a seal lip, projected from the welt portion for effecting sealing of an opening on which the weatherstrip is installed, is provided, comprising: introducing the end members to a mold in a spaced apart relationship such that a gap is present between the end members: closing the mold so as to apply pressure to the end members such that the sealing portion is compressed to substantially assume the shape of a seal lip portion thereof, a cavity having the shape of the seal lip portion being formed across the gap according to closure of the mold; injecting a resilient material into the gap for forming a joining member connecting the end members, a shape of the joining member between sealing portions of each of the end members being substantially that of the seal lip portion of the sealing portion such that a surface of at least a portion of the seal lip is contiguous across the joining member.

According to another aspect of the present invention a method of joining end members of a weatherstrip having a welt portion for facilitating installation of the weatherstrip and a sealing portion, including a seal lip, a support lip opposed to the seal lip and an elongate hollow defined between the seal lip and the support lip, the sealing portion being projected from the welt portion for effecting sealing of an opening on which the weatherstrip is installed, is provided, comprising: inserting the end members to an open mold in a spaced apart relationship such that a gap is present between the end members; closing the mold so as to apply pressure to the end members such that the support lip is curved inwardly against an inner surface of the seal lip so as to collapse the hollow in the vicinity of the end members, the support lip and the seal lip being compressed to substantially assume the shape of the seal lip portion thereof, a cavity having the shape of the seal lip portion being formed across the gap according to closure of the mold; injecting a resilient material into the gap for forming a joining member, having an upper sealing connection portion and a lower welt connection portion, connecting the end members, a shape of the upper sealing connection portion of the joining member between sealing portions of each of the end members being substantially that of the seal lip portion of the sealing portion.

According to still another aspect of the invention, an apparatus for joining end members of a weatherstrip is provided, comprising: an upper mold shaped for forming an upper side of a joining member for connecting the end members of the weatherstrip; a lower mold shaped for forming a lower side of the joining member; an inner mold shaped for forming an inner contour of the joining member; an injection channel for injecting a resilient material for forming the joining member; the upper mold, the lower mold and the inner mold being positionable in a first open condition for receiving end members of the weatherstrip in a spaced apart relation, and a second closed condition for defining a gap having a predetermined shape between the end members of the weatherstrip.

DESCRIPTION OF THE PREFERRED EMBODIMENT

Figure 1:
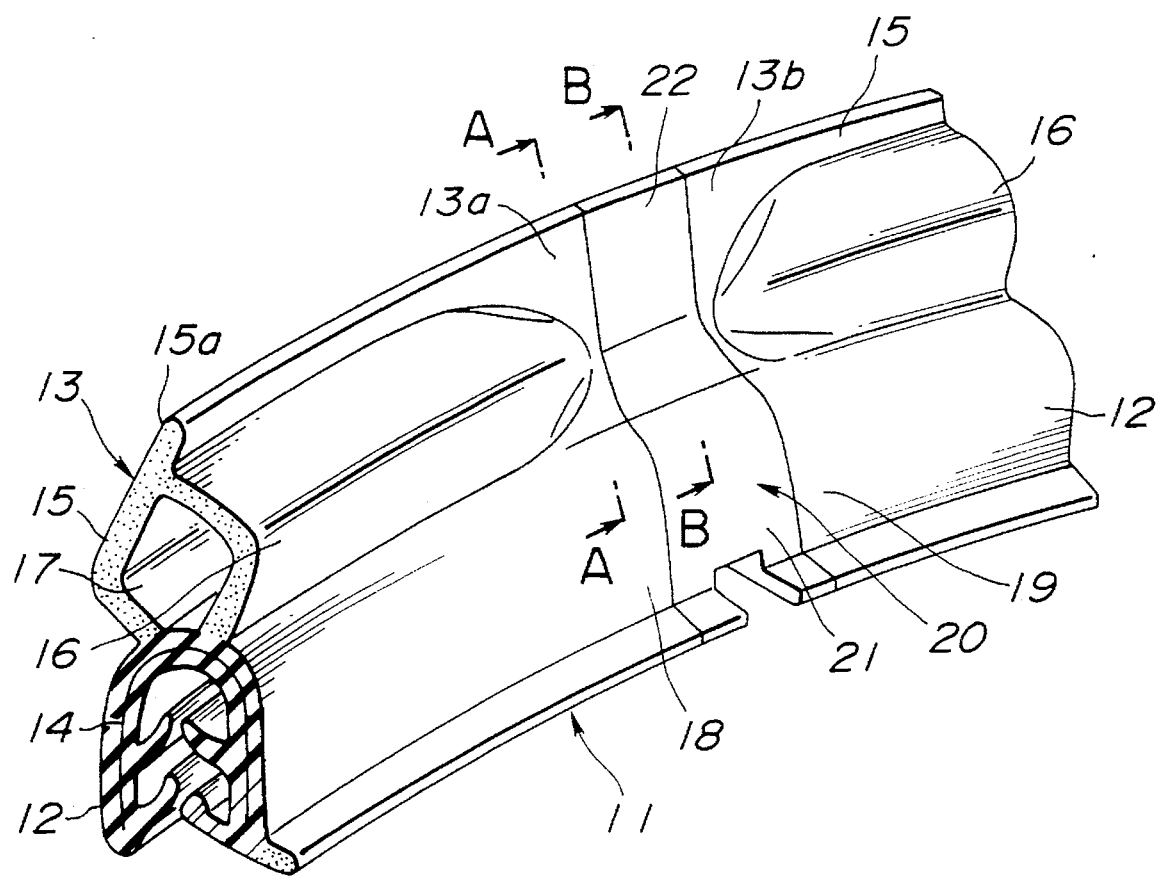
FIG. 1 is a perspective view of end portions of a weatherstrip joined according to a first preferred embodiment of the method of the invention.
Figure 2:
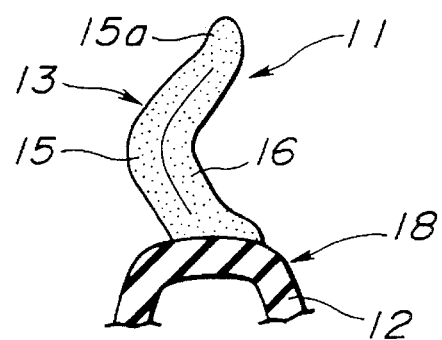
FIG. 2 is a cross-sectional view taken along line A—A of FIG. 1.
Figure 3:
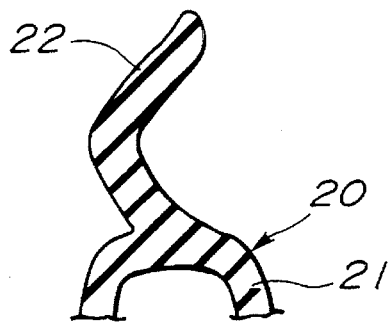
FIG. 3 is a cross-sectional view taken along line B—B of FIG. 1.

Referring now to the drawings, particularly to FIGS. 1–3, a first preferred embodiment of the invention will be described hereinbelow in detail.

First, a weatherstrip 11 according to the invention comprises a welt 12, which engages the rim of a vehicle opening on which the weatherstrip is to be installed, and a sealing portion 13 which is supported by the welt 12 so as to project from the rim of the opening to seal the opening according to pressure applied by closing the lid, door, etc., (not shown) which covers the opening. The welt 12 is formed of substantially solid rubber and may include, as provided in the present embodiment, a reinforcing member 14, made of metal, for example. The sealing portion 13 is made of substantially soft, or spongy rubber and includes a seal lip 15 comprising one side of the sealing portion 13 including a tongue portion 15a projected at an end thereof for contacting an inner surface of a compartment lid (not shown) when the compartment sealed by the weatherstrip 11 is closed, and a support lip 16 formed so as oppose the seal lip 15 with a hollow portion 17 defined therebetween.

Figure 18:
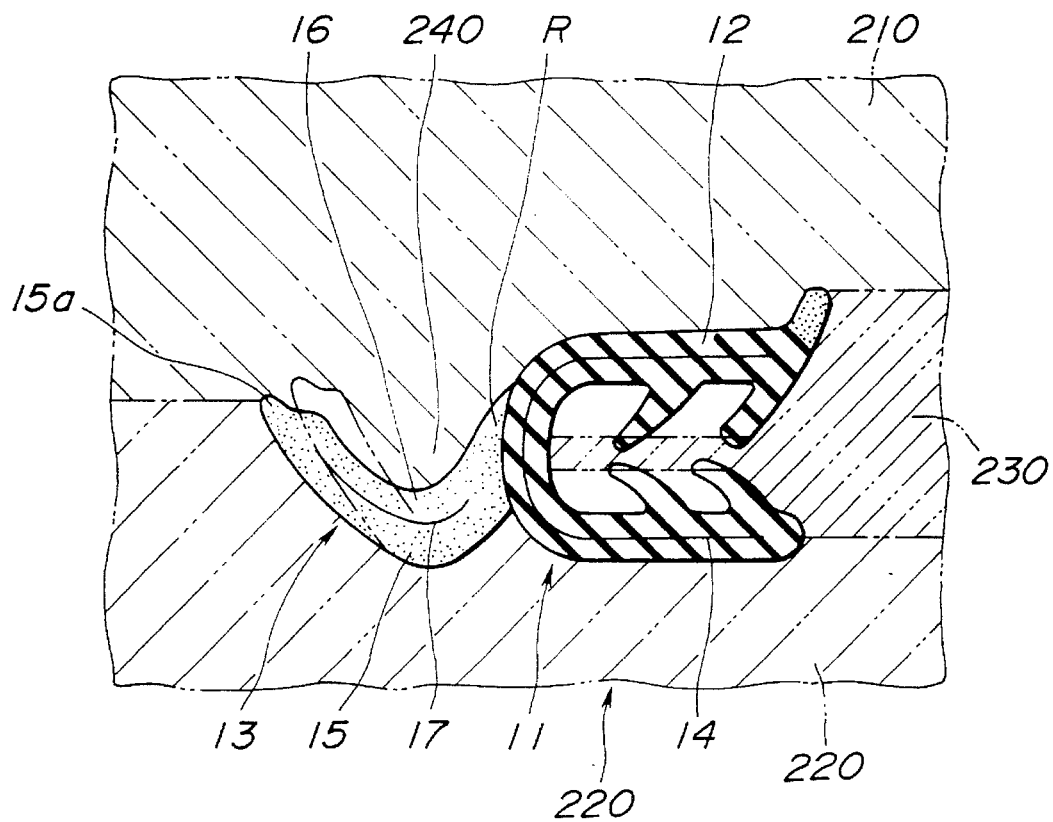
FIG. 18 shows an end portion of a weatherstrip inserted into a mold for joining according to the method of the invention.
Figure 25:
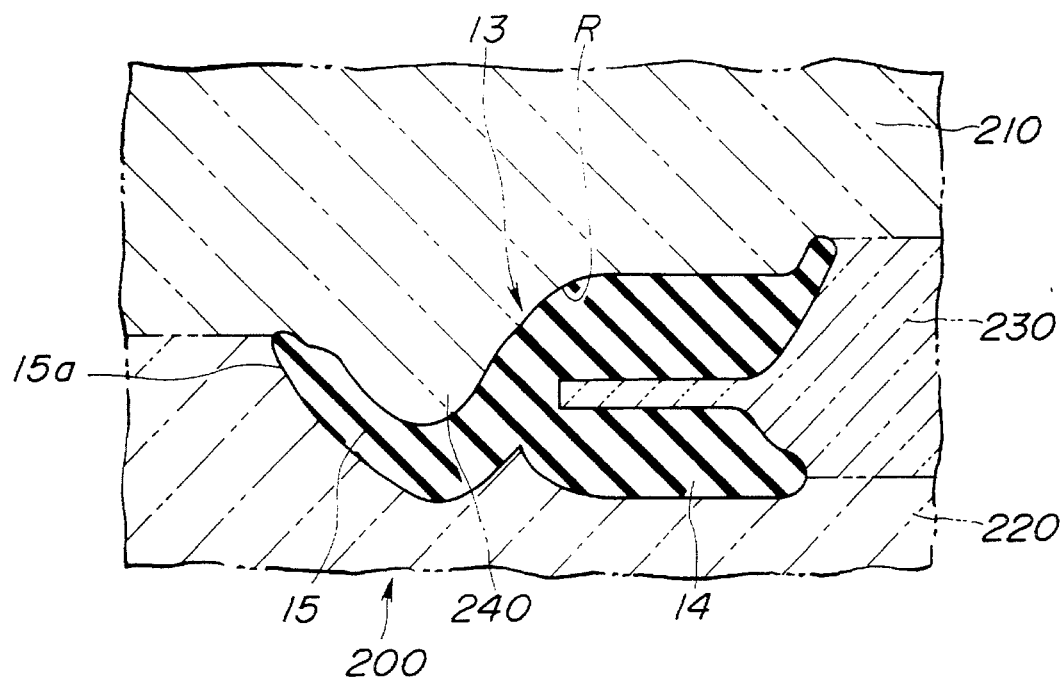
FIG. 25 ; shows a joining member according to the invention is a mold for forming same.

The weatherstrip 11 has ends 18, 19 thereof to be joined according to the method of the invention. According to this, the ends are positioned adjacent each other held in a mold 200 or a metal die as seen in FIG. 18. By this, the seal lip 15 and the support lip 16 are crushed together between a top portion 210 and a bottom portion 220 of the mold, seal ends 13a being formed by pressure of the die, or mold 200. Then, as seen in FIG. 25, a material for forming a joining member 20, which may be a solid rubber such as used for the welt 12, is injected into the mold 200. This process firmly bonds the ends 18, 19 of the weatherstrip 11 to the sides of the joining member 20. It will be noted that the joining member 20 as formed according to the invention has an upper portion 22 corresponds to the shape of the seal lip 15 and is contiguous outer surface thereof and with the tongue 15a thereof, a lower portion 21 which is formed an inverted U-shaped configuration and is contiguous with the welt 12. FIGS. 2 shows a cross-section along a line A—A of FIG. 1 showing the weatherstrip proximate the end portion 18 thereof, as may be seen, the seal lip 15 and the support lip 16, of sponge rubber, are pressed closely together. FIG. 3 shows a cross-section along line B—B of FIG. 1 taken through the joining member 20. As may be seen the joining member 20 is of a single material such as solid rubber, as noted above. FIG. 25 shows the upper mold 210, the lower mold 220 and the inner mold 230 brought together to form the mold cavity R for providing the appropriate shape of the upper portion 22 of the joining member 20.

Thus, according to this, since the upper portion 22 of the joining member 20 is formed according to a cavity R of the mold 200 being the same shape as the pressed together seal lip and support lip, as shown in FIG. 18, the upper portion 22 of the joining member 20 is active to provide sealing to a compartment closed by the weatherstrip in conjunction with the sealing portion 13 and optimal sealing is assured around the entire perimeter sealed by the weatherstrip 11.

Also, since no joining member need be inserted into the hollow portion 17 of the weatherstrip, forming the joining member 20 is simplified and may be accomplished taking up a minimum of space and flexibility if maintained to allow the joined portion to be installed in small or irregularly shaped compartments. Also, since such a insert type joining member 6, as employed in the prior art is not required, costs are reduced and processing is simplified.

Figure 5:
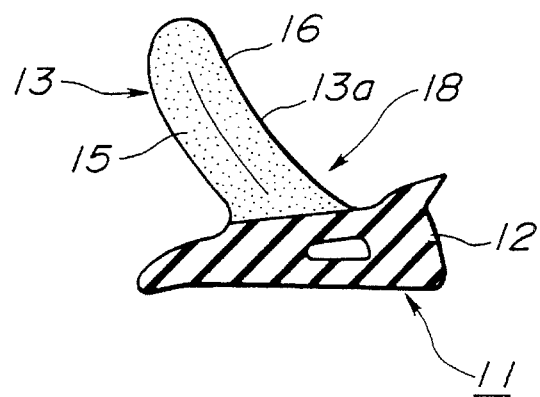
FIG. 5 is a cross-sectional view taken along line C—C of FIG. 4.
Figure 6:
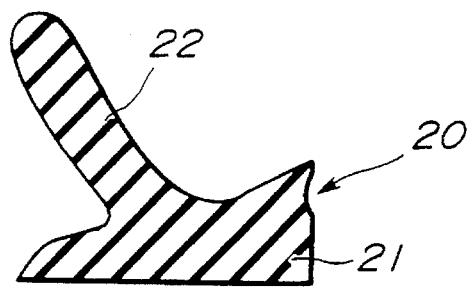
FIG. 6 is a cross-sectional view taken along line D—D of FIG. 4.

A second embodiment of a method of joining ends of a weatherstrip according to the invention will be explained hereinbelow with reference to FIGS. 4–6, like numerals will be used to refer to like parts of both embodiments for simplicity.

Figure 4:
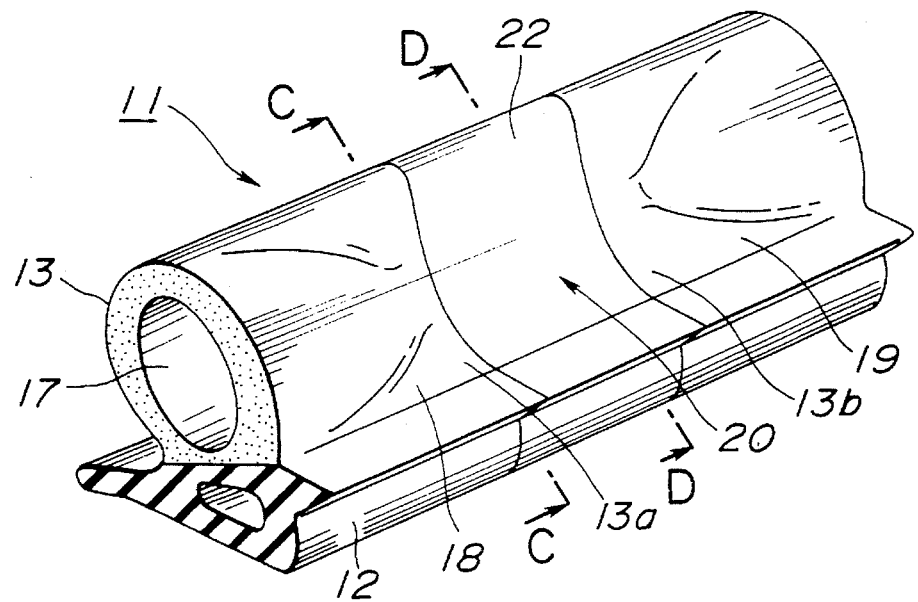
FIG. 4 is a perspective view of end portions of a weatherstrip joined according to a second preferred embodiment of the method of the invention.

Referring to FIG. 4 it may be seen that the present embodiment is applied to a type of weatherstrip commonly used for automotive door/wells and the like. The weatherstrip comprises a welt portion 12 of substantially solid rubber, and a sealing portion 13, which, according to the present embodiment is substantially round, having a hollow portion 17 defined therethrough. As with the previous embodiment, the ends 18, 19 are positioned adjacently in a mold 200. Pressing action of the mold 200 is active to form seal ends 13a, 13a at each 19 and material is injected into the mold 200 for forming a joining member 20, sides of which are bonded to the sides 18, 19 of the weatherstrip 11. As seen in FIGS. 5 and 6, a configuration of an upper portion 22 of the joining member 20 is the same as that of the sealing portion in a compressed state, such that when the door/well is shut by a vehicle door, the same sealing characteristics as provided by the sealing portion 13 is also afforded by the upper portion 22 of the joining member 20, such that reliable sealing around the entire perimeter on which the weatherstrip is installed may be assured. It will also be noted that the lower portion 21 of the joining member 20 is formed so as to be contiguous with the welt 12 so that the joining member 20 may be easily installed in the same manner as the welt 12. According to this, all the advantages of the above described first embodiment may be obtained.

Figure 8:
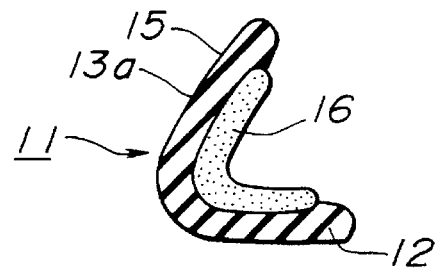
FIG. 8 is a cross-sectional view taken along line E—E of FIG. 7.
Figure 9:
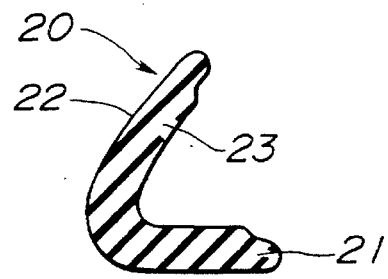
FIG. 9 is a cross-sectional view taken along line F—F of FIG. 7.

A third embodiment of a method of joining ends of a weatherstrip according to the invention will be explained hereinbelow with reference to FIGS. 7–9, like numerals will be used to refer to like parts of all embodiments for simplicity.

Figure 7:
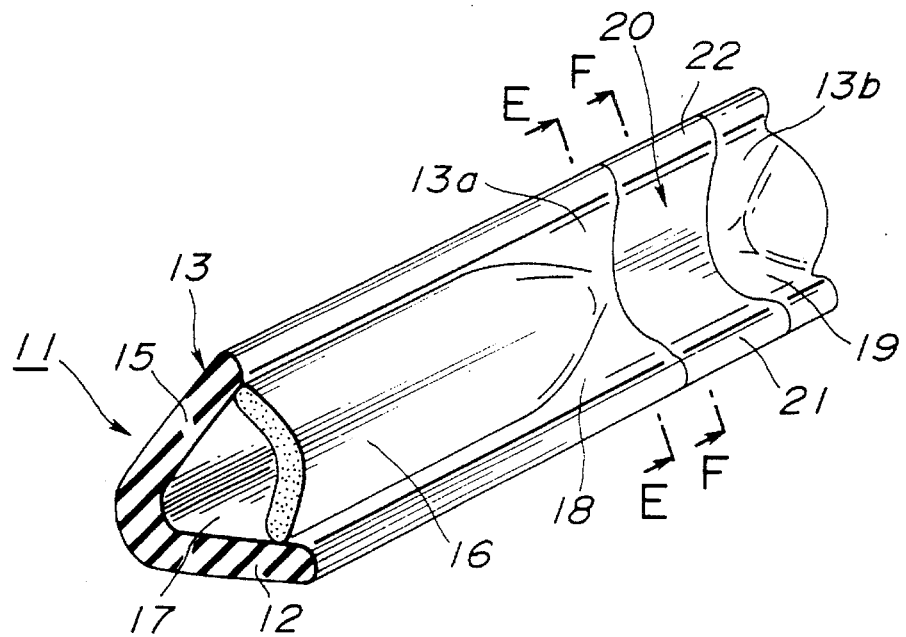
FIG. 7 is a perspective view of end portions of a weatherstrip joined according to a third preferred embodiment of the method of the invention.

Referring to FIG. 7 it may be seen that the present embodiment is applied to a type of weatherstrip commonly used for automotive radiator grills and/or engine hood compartments, and the like. The weatherstrip comprises a V-shaped solid rubber portion comprising a welt 12 on a lower side and a sealing portion 13 including a seal lip 15 on an upper side thereof. A support lip 16, of sponge rubber or the like is provided between the upper side of the seal lip 15 and a lower forward side of the welt so as to bridge the top of the 'V' shape and define a hollow portion 17 similarly to previous embodiments. As described for the previous embodiments, ends 18, 19 are positioned adjacently in a mold 200. Pressing action of the mold 200 is active to form seal ends 13a, 13a at each end 18, 19 and is injected into the mold 200 for forming a joining member 20, sides of which are bonded to the sides 18, 19 of the weatherstrip 11. As seen in FIGS. 8 and 9, a configuration of the joining member 20 is the same as that of the weatherstrip in a compressed state, such as when an engine hood is shut, for example, pressing the support lip into the V shape of the welt and the seal lip, such that the hollow portion 17 is collapsed. It will further be noted that the upper portion 22 may be formed with a projected portion 23 so as to prevent lowering of the overall strength of the seal portion 22. As with the previous embodiments, reliable sealing around the entire perimeter on which the weatherstrip is installed may be assured. It will also be noted that the lower portion 21 of the joining member 20 is formed so as to be contiguous with the welt 12 so that the joining member 20 may be easily installed in the same manner as the welt 12. According to this, all the advantages of the above described first and embodiments may be obtained.

Figure 10:
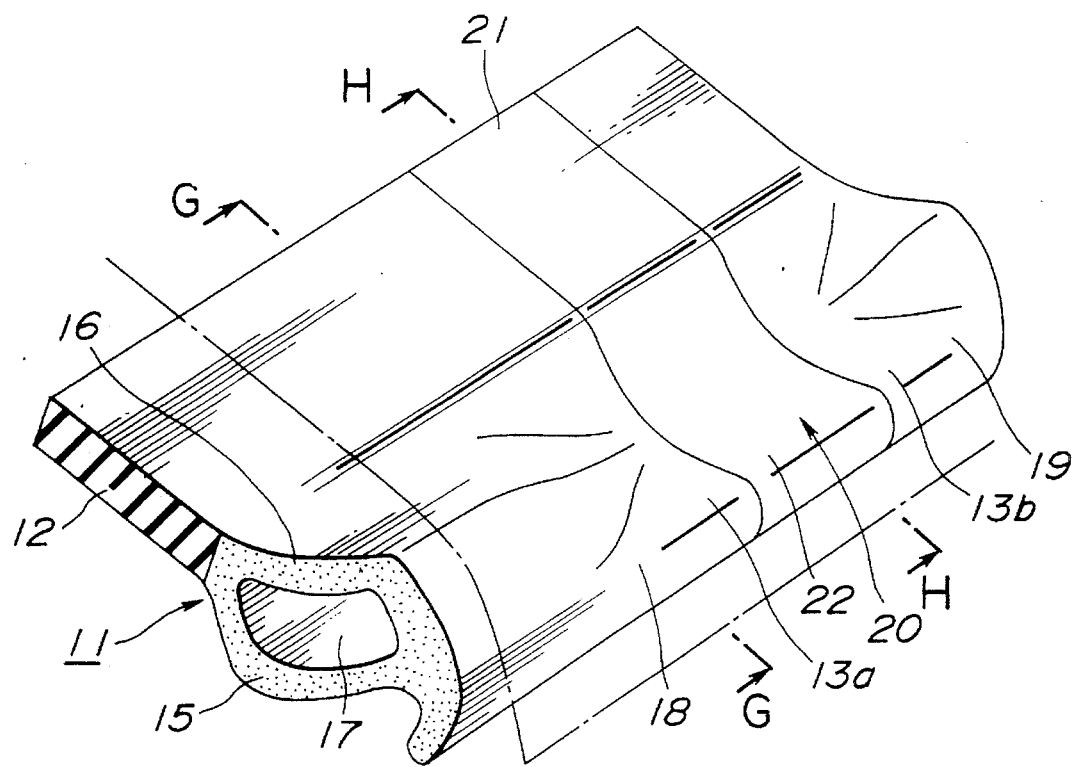
FIG. 10 is a perspective view of end portions of a weatherstrip joined according to a fourth preferred embodiment of the method of the invention.
Figure 11:
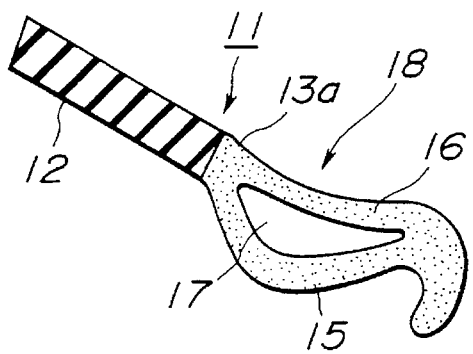
FIG. 11 is a cross-sectional view taken along line G—G of FIG. 10.
Figure 12:
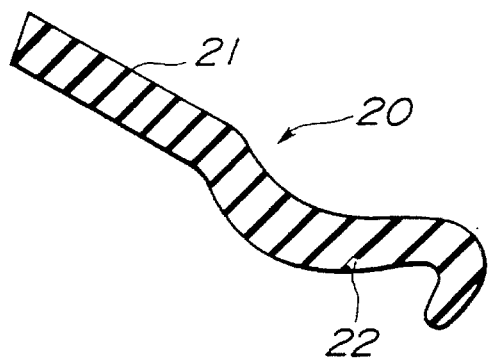
FIG. 12 is a cross-sectional view taken along line H—H of FIG. 11.

Referring now to FIGS. 10–12, a fourth embodiment of the invention will be described hereinbelow in detail.

Referring to FIG. 10 it may be seen that the present embodiment is applied to a type of weatherstrip which is the reverse of that of the previous embodiments and commonly used for engine hoods and the like. The weatherstrip comprises a substantially rectangular solid rubber welt 12 having a sealing portion 13 attached thereto at one side, including a seal lip 15 on a lower upper side thereof. A support lip 16, provided on an upper side with a hollow portion 17 defined therebetween similarly to the previous embodiments. As described for the previous embodiments, ends 18, 19 are positioned adjacently in a mold 200. Pressing action of the mold 200 is active to form seal ends 13a, 13a 18, 19 and material is injected into the mold 200 for forming a joining member 20, sides of which are bonded to the sides 18, 19 of the weatherstrip 11. As seen in FIGS. 11 and 12, a configuration of the joining member 20 is the same as that of the weatherstrip in a compressed state, such as when an engine hood is shut, for example. As with the previous embodiments, reliable sealing around the entire perimeter on which the weatherstrip is installed may be assured. It will also be noted that the lower portion 21 of the joining member 20 is formed so as to be contiguous with the welt 12 so that the joining member 20 may be easily installed in the same manner as the welt 12. According to this, all the advantages of the previously described embodiments may be obtained.

Figure 13:
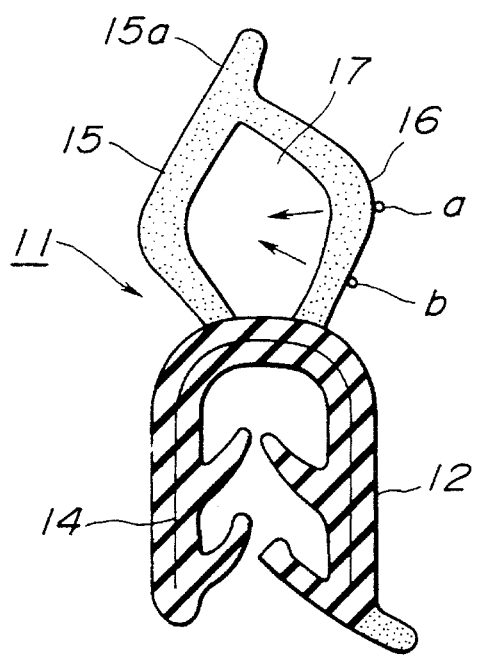
FIG. 13 is a cross-sectional view of a weatherstrip end portion according to the first embodiment.

Referring now to FIG. 10, a cross-sectional view of a weatherstrip as described in relation to the first embodiment is shown, according to pressing of the ends of the weather strip 11 for forming the end portions 13a, 13a, a central outer portion 'a' of the of 'the support lip 16 is pushed in the direction of the seal lip 15 as shown by an arrow in FIG. 13. Further, a lower portion of the support lip 16 in the vicinity of a portion 'b', is pushed inwardly in the direction of a second arrow of FIG. 13, such that the support lip 16 is pushed against the seal lip 15.

Figure 14:
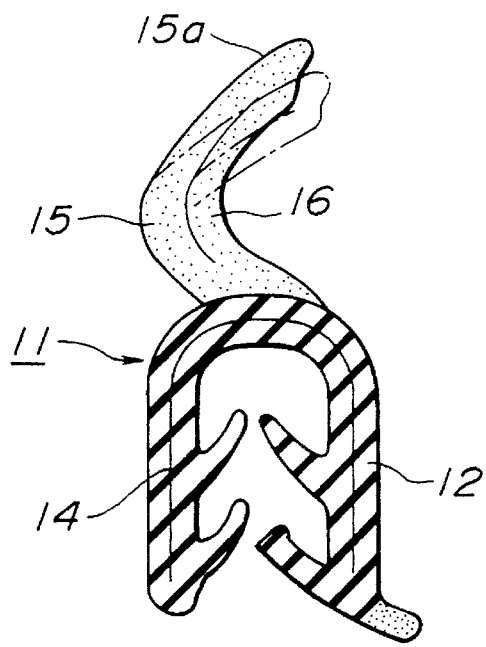
FIG. 14 is a cross-sectional view of the weatherstrip end portion of FIG. 13 in a pressed condition thereof, according to closure of a compartment sealed thereby.

Referring now to FIG. 14, according to the above-described positioning of the support lip 16, an upper side of the support lip is pulled in the direction of the welt 12, as shown by a dotted line in FIGS. 14 and 18. This pulls the tongue 15a of the seal lip 15 downward also and may degrade sealing performance in the vicinity of the joining member 20. Thus, a fifth embodiment of the invention is proposed for countering such a drawback. The fifth embodiment of the invention will be explained hereinbelow in detail with reference to FIGS. 15 and 16.

Figure 15:
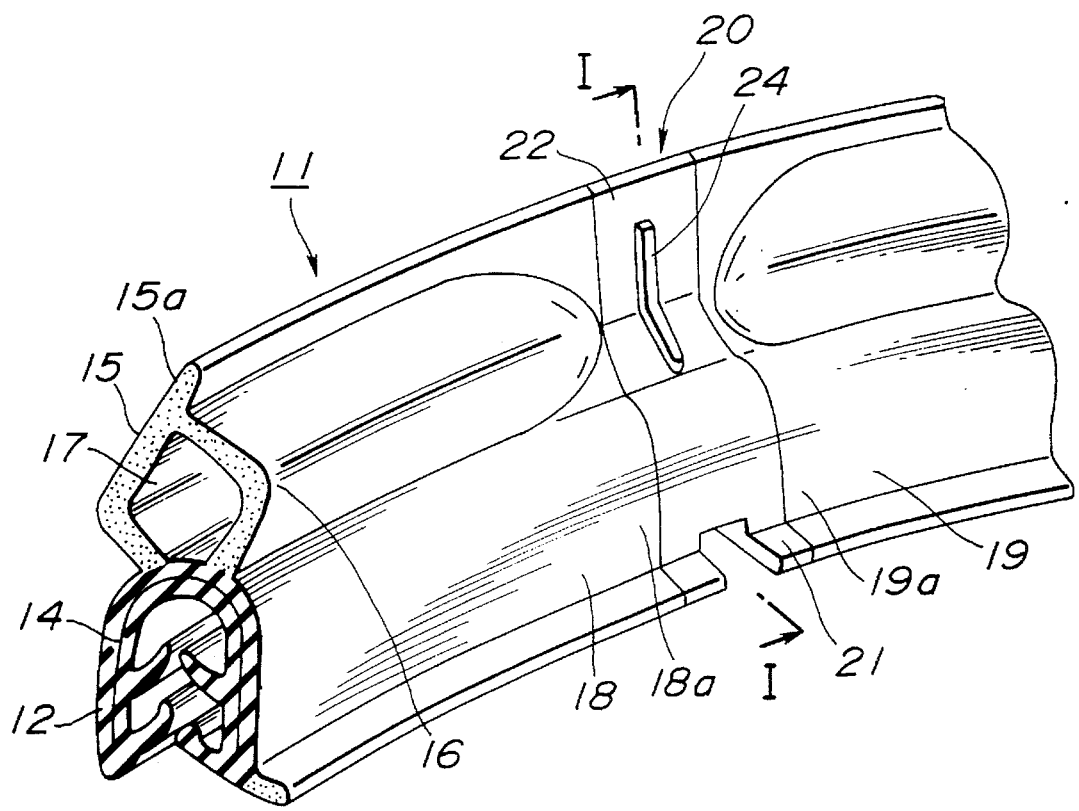
FIG. 15 a shows joining member according to a fifth embodiment of the invention wherein a single rib is further provided.
Figure 16:
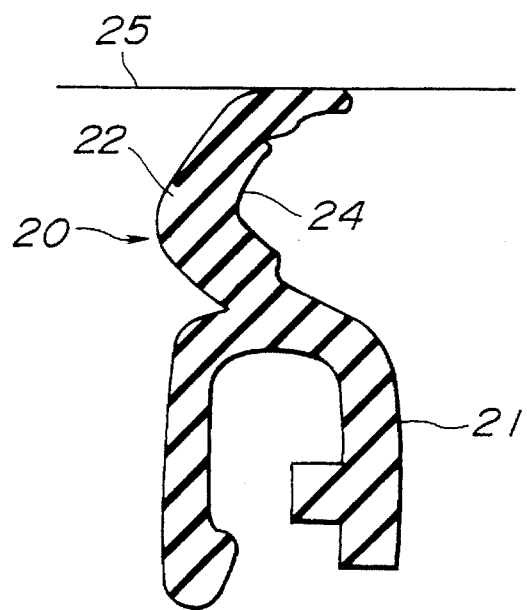
FIG. 16 is a cross-sectional view taken along line I—I of FIG. 15.

As may be seen in FIG. 15, the upper portion 22 of the joining member 20 is provided with a vertical rib 24 on a side corresponding to a side of the weatherstrip 11 on which the support lip 16 is provided. The rib is projected from the surface of the upper portion 22 and may be of round, triangular, or rectangular and formed of the same solid rubber material as the joining member 20. As may be seen in FIG. 16, the provision of the rib 24, prevents the seal lip 15 from being pulled downward according to the pushing in of the support lip 16. Thus, a greater sealing area is available in the vicinity of the joining member 20 and the seal lip 15 and tongue 15a thereof press firmly upwards for providing reliable and secure sealing of member, such as a door, etc., closing a compartment 200 B sealed by the weatherstrip 11. According to this embodiment, optimal sealing performance is maintained around the perimeter sealed by the weatherstrip even at the location of the joining member. In addition, all the advantages of the previous embodiments are also available.

Figure 17:
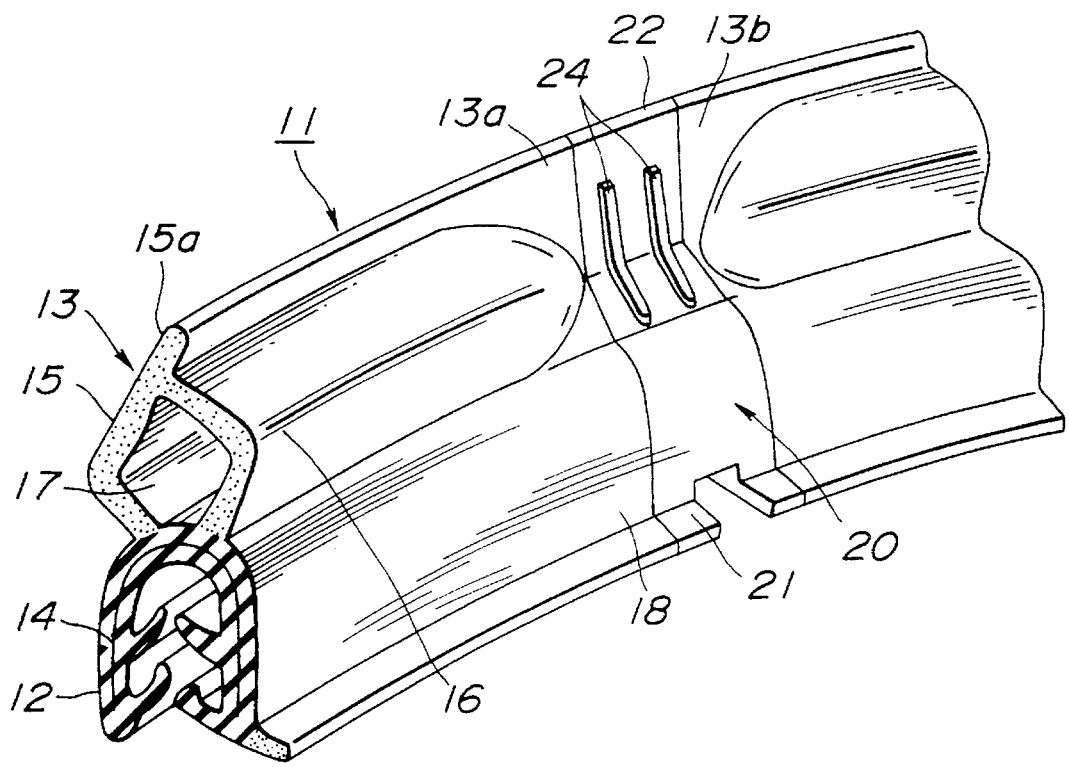
FIG. 17 shows a joining member according to the fifth embodiment wherein a pair of ribs are provided.

FIG. 17 shows a modification of the above described fifth embodiment. According to this, a plurality of ribs 24 is provided such that upward flexure of the upper portion 22 of the joining member 20 is further enhanced. Thus, the advantages of the fifth embodiment are provided and sealing may be further enhanced while a strength and durability of the sealing characteristics of the joining member are increased.

A sixth embodiment of the present invention for compensating for pulling or flexure of the sealing portion 13 when compressed in presented hereinbelow with reference to FIGS. 19–24.

Figure 19:
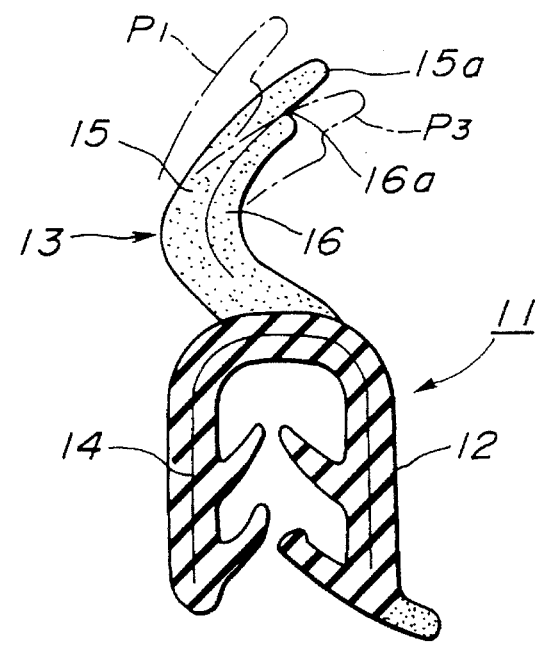
FIG. 19 is a cross-sectional view explaining flexure of a sealing portion of a weatherstrip in a compressed condition.
Figure 20:
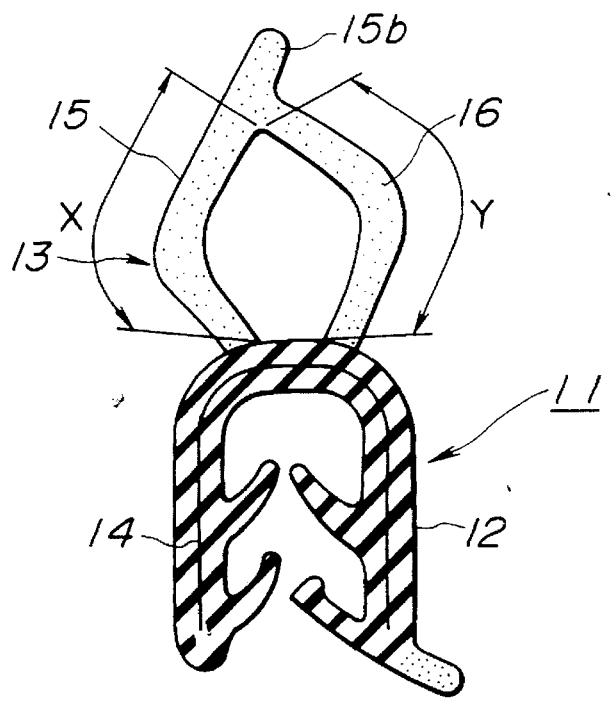
FIG. 20 is a cross-sectional view of a weatherstrip for explaining flexure of the sealing portion.

Referring to FIG. 20, it may be seen that, according to the configuration of the sealing portion 13, compression thereof in a mold 200 to effect joining of end portions 18, 19 of the weatherstrip 11, may cause the sealing portion to pull, or flex in undesirable ways. For example, if an overall outer surface width x of the seal lip 15 is less than an overall surface width y of the support lip, compression of the sealing portion 13 will cause the sealing portion to flex upwardly to a position P1, as seen in FIG. 19. On the other hand, if the overall outer surface width x of the seal lip 15 is greater than the overall surface width y of the support lip, compression of the sealing portion 13 will cause the sealing portion to flex, or pull downwardly to a position P2, also shown in FIG. 19.

Figure 21:
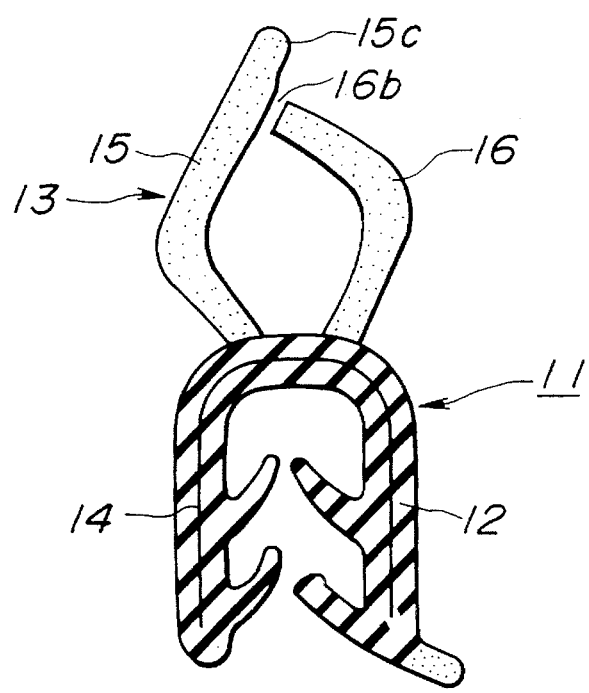
FIG. 21 is a cross-sectional view of a sixth embodiment of a method according to the invention.
Figure 22:
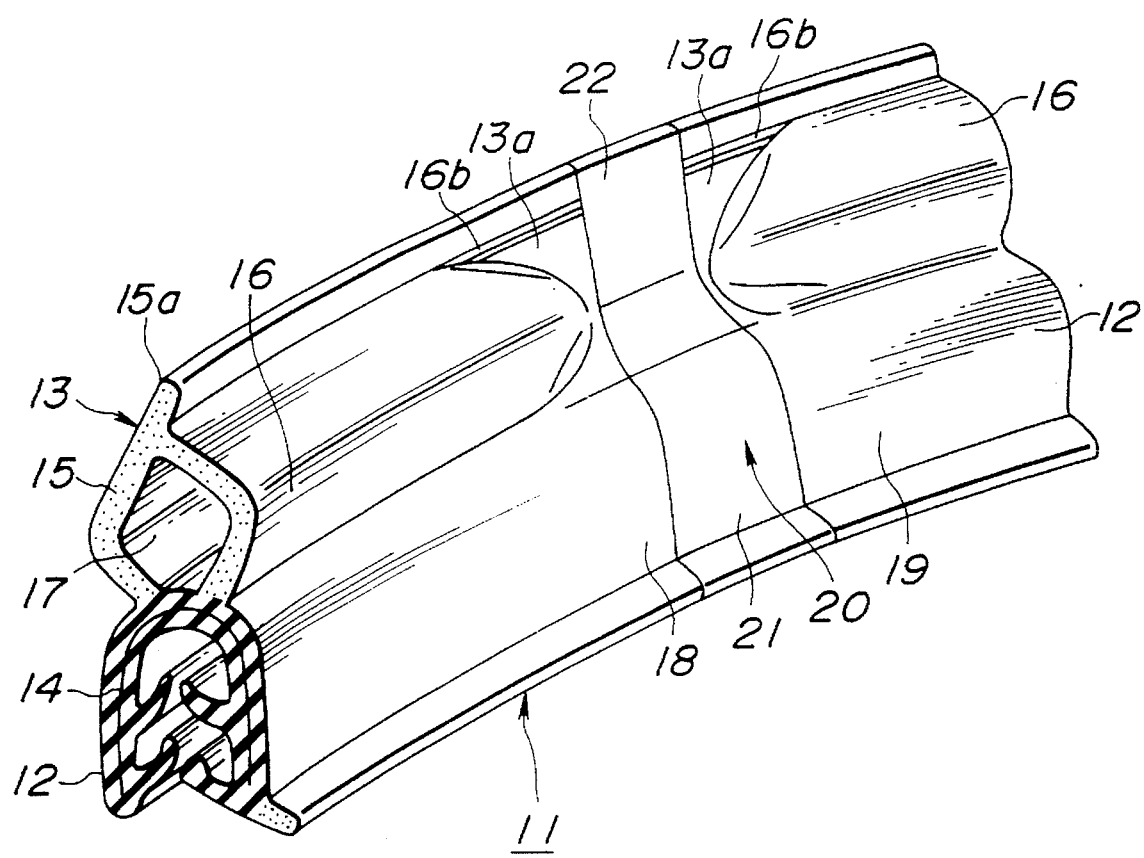
FIG. 22 shows a perspective view of the sixth embodiment of the method of the invention.

Thus, according to a sixth embodiment of the invention, as best seen in FIGS. 21 and 22, a slit 16b may be cut lengthwise in the support lip 16 in the vicinity of the end portions 18 and 19 for allowing the scaling portion 13 to be compressed to the desired shape without flexing stress being applied to the sealing portion 13 after joining has been performed.

Figure 23:
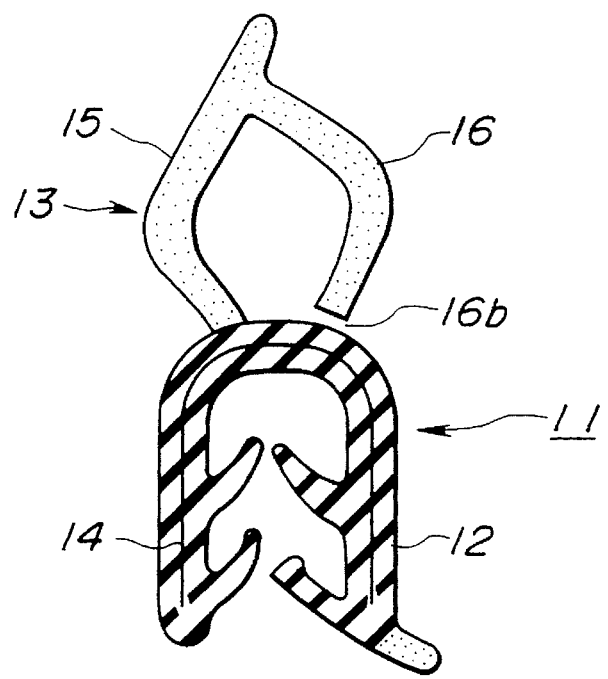
FIG. 23 shows a alternative construction of the sixth embodiment of FIG. 21.
Figure 24:
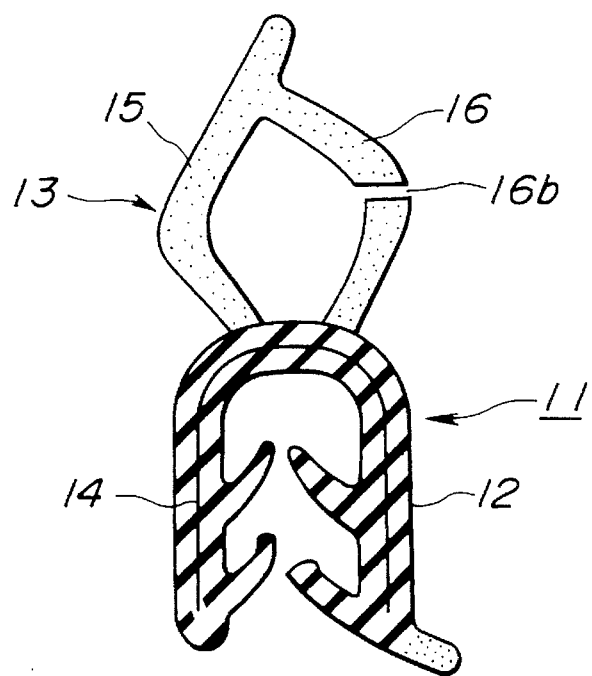
FIG. 24 shows another alternative construction of the sixth embodiment of FIG. 21.

FIGS. 23 and 24 show alternative locations for the slit 16b, of course, the same advantages are as for previous embodiments.

Hereinbelow, a structure of a mold for effecting joining of end portions of a weatherstrip according to the method of the invention will be explained in detail with reference to FIGS. 26–29.

Figure 26:
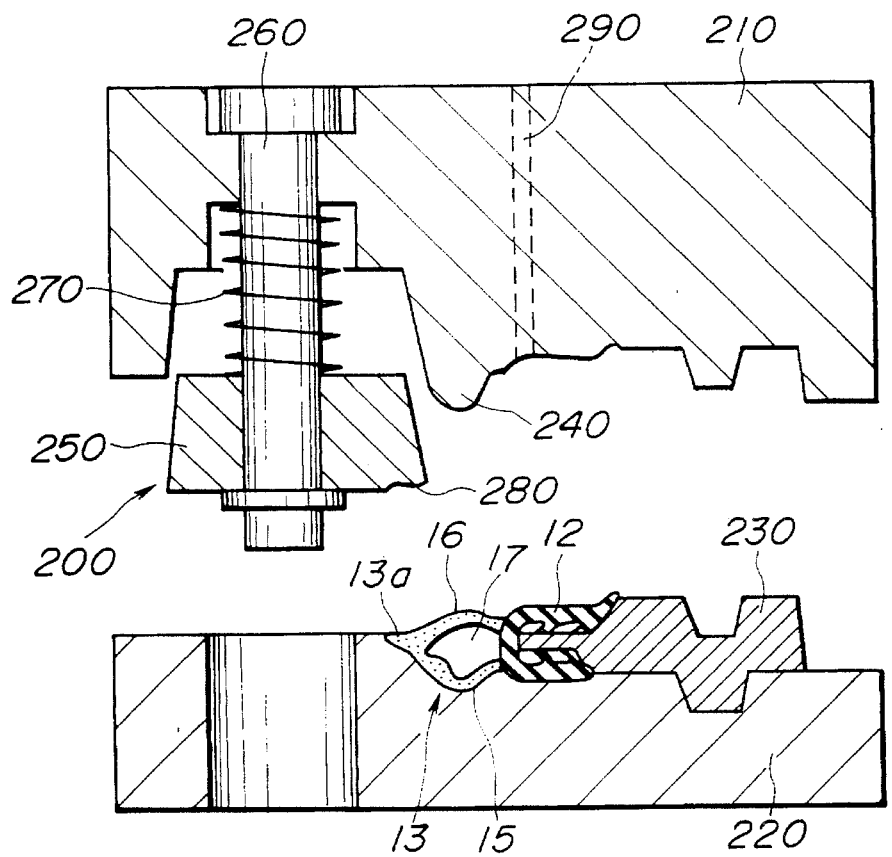
FIG. 26 shows a mold for joining ends of a weatherstrip according to the method of the invention wherein ends of the weatherstrip are positioned to be joined.

Although FIGS. 18 and 25 show a simple three piece mold 200 comprising and upper mold 210, a lower mold 220 and an inner mold 230, the embodiments of the present invention may be efficiently carried according to a mold construction as shown in FIG. 26. According to this, a mold 200 comprises the above mentioned upper mold 210, lower mold 220 and inner mold 230 and a movable block 250 having a restricting portion 28 for suitably shaping the end portions 18 and 19 of the weatherstrip 11 in a manner according to the method of the invention and the appropriate embodiment thereof according to a type of weatherstrip to be joined. The restricting portion 28 of the movable block is effective to assure correct positioning of the tongue 15a and upper side of lip 15 such that, when joining is accomplished, the contiguity of a sealing surface of the seal lip 15 and the joining member 20 is optimally maintained. The movable block is mounted on a shaft 26 and biased in the downward direction by a coil spring 270. It will further be noted that the upper mold 210 is provided with an injection channel 290 for introducing rubber material to the mold 200 when the mold 200 is closed for forming the shaped cavity R. Also, at a lower side of the upper mold adjacent the movable block 250, a projection 240 is formed for suitably compressing the sealing portion 13 of the weatherstrip 11 before injection of the rubber material through the injection channel 290.

Figure 27:
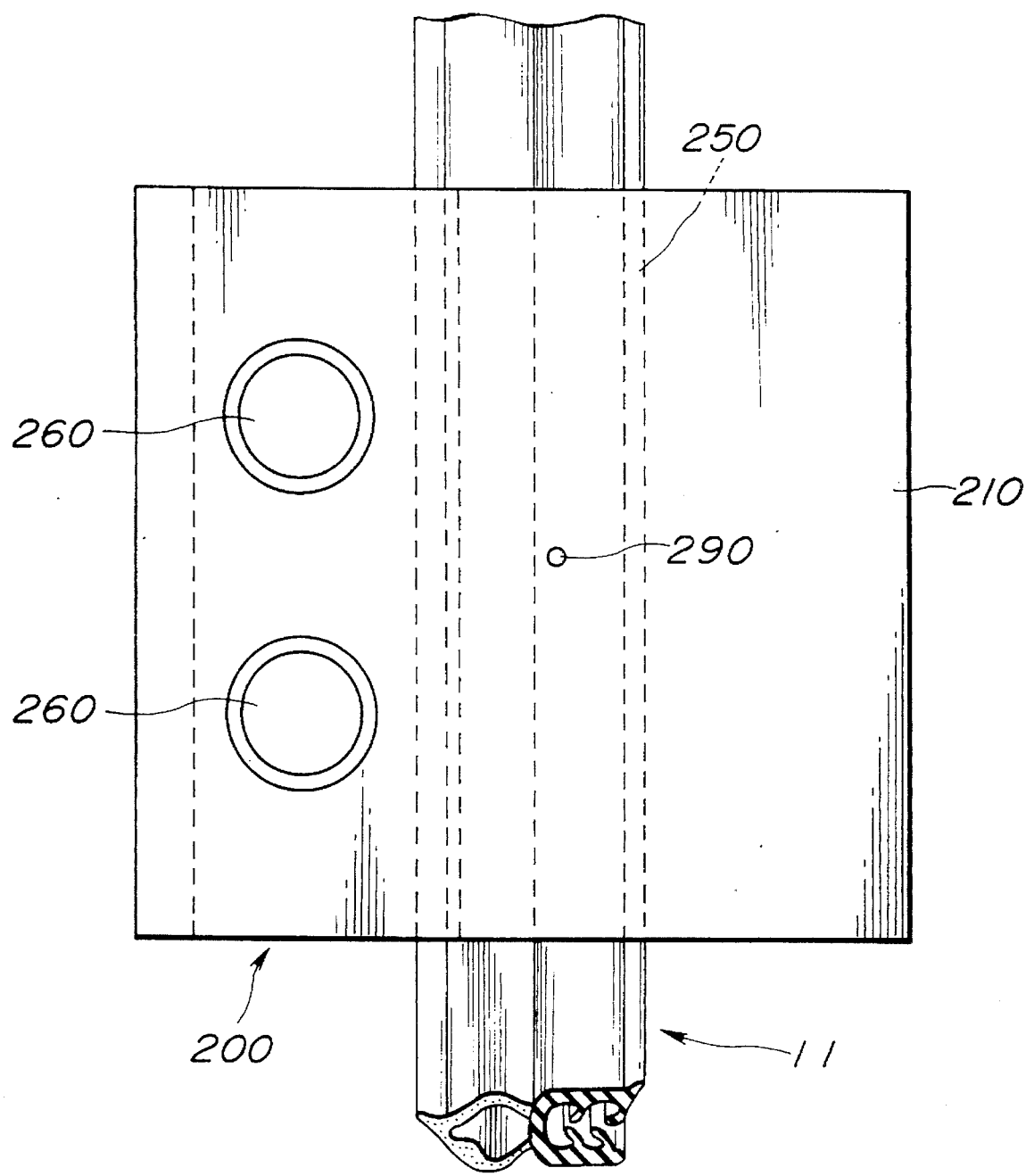
FIG. 27 is a plan view of the mold of FIG. 26.

Referring to FIG. 27 a plan view of the mold 200 is shown, as may be seen, two shafts 260, 260 are provided mounting two movable blocks 250, 250 for correctly positioning each of the end portions 18, 19 of the weatherstrip 11, respectively. The injection channel 290 is centrally located between the shafts 260, 260 for suitably forming the joining member 20 between the end portions 18, 19.

Figure 28:
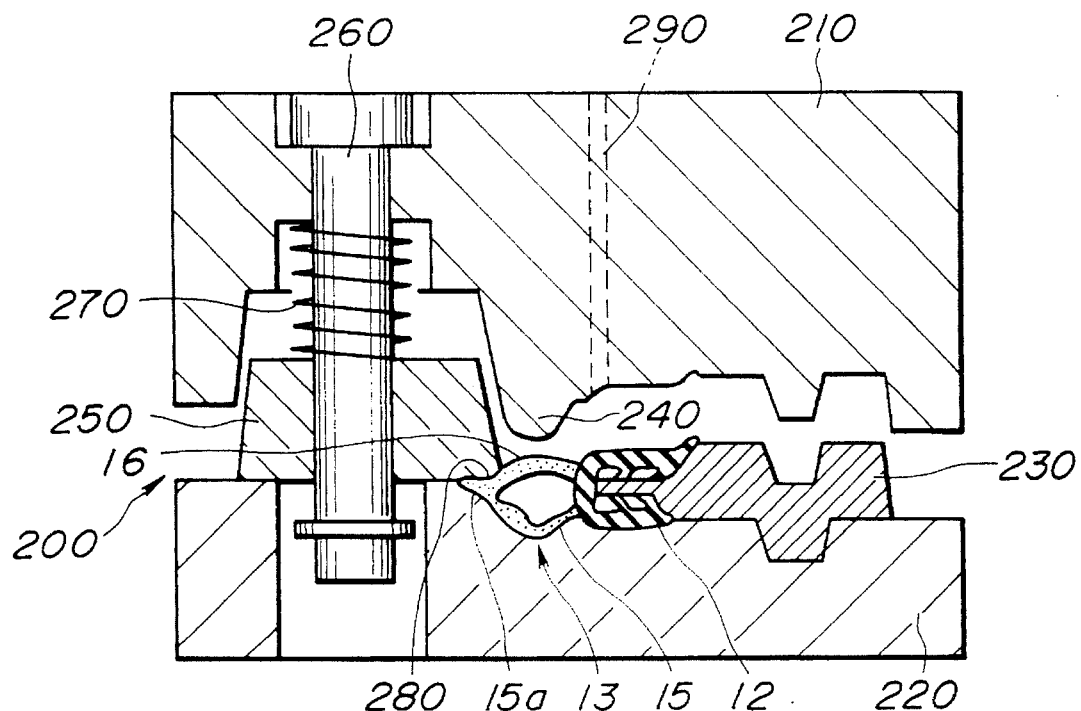
FIG. 28 is the mold of FIG. 26 in a first position wherein corner restricting portions are positioned.
Figure 29:
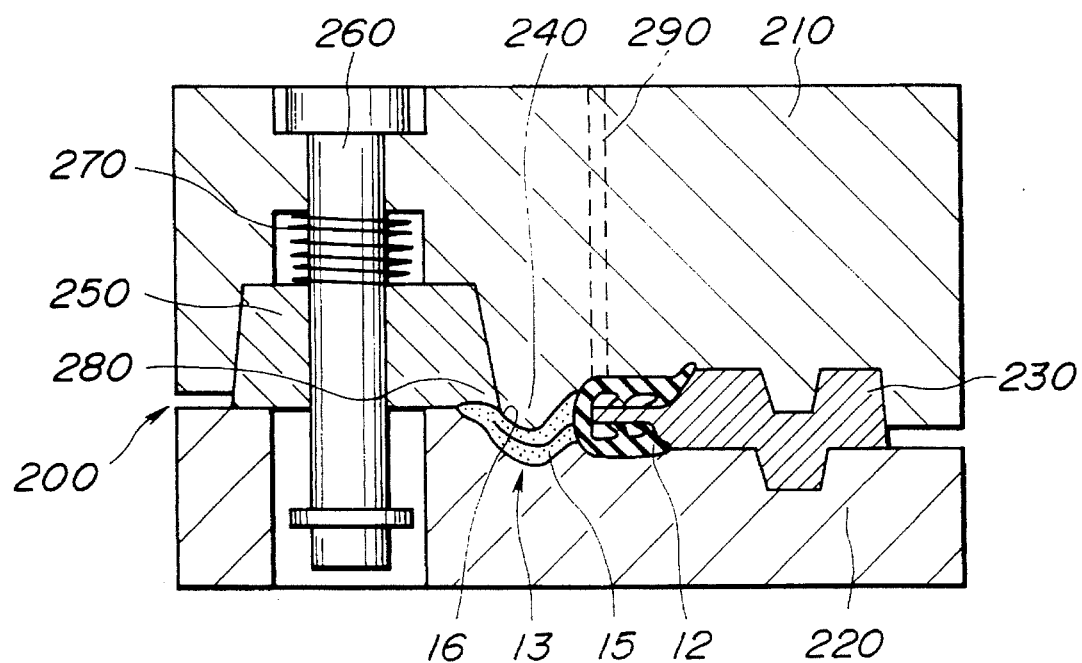
FIG. 29 shows the mold of FIG. 20 in a second position wherein the sealing portion is compressed and injection of the rubber material for forming a joining member may be carried out.
Figure 30:
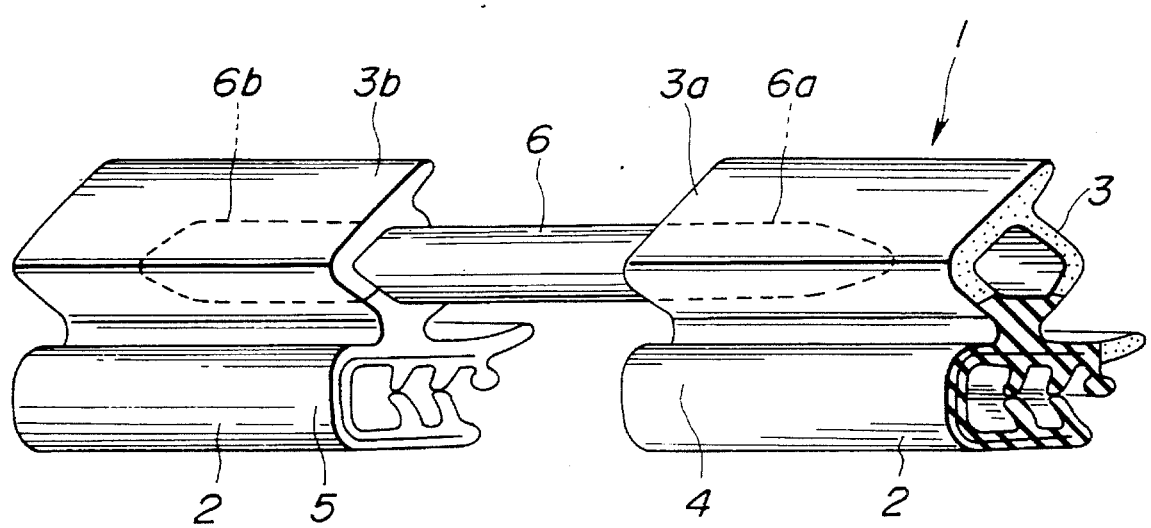
FIG. 30 shows a perspective view of a conventional method of joining ends of a weatherstrip.

FIGS. 28 and 29 show the mold 200 during a process of joining end members 18, 19 of the weatherstrip 11 according to the method of the invention. FIG. 28 shows the mold 200 in a first position wherein the restricting portions 280, 280 of each of the movable blocks 250, 250 are active for clamping the tongues 15a, 15a of each of the ends 18, 19, so as to assure the contiguity of the sealing surface. Then, as shown in FIG. 29, the upper mold is lowered such that the projection 240 of the upper mold is brought down to compress the sealing portion 13 of the weatherstrip 11. In this closed position, the components of the mold 200 are active to form the shaped cavity R as explained previously. After this, the rubber material (not shown) is injected through the injection channel 290 and permitted to cure, or harden. Then the mold 200 may be opened and joining of the end members 18, 19 of the weatherstrip 11 is accomplished.

It will be noted that the above-described mold structure may be adapted to any of the preferred embodiments and may be utilized whether a slit 16b is provided for preventing flexure of the sealing portion 13 or whether the upper portion 22 of the joining member 20 is provided with one or more ribs for countering flexure of the scaling portion 13.

It will further be noted that, although according to the disclosed embodiments, end members of a single weatherstrip are joined for forming a looped weatherstrip, the method of the invention may also be used for joining end members of different weatherstrips having the same configuration, for forming a single elongated weatherstrip, for example.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of joining end members of a weatherstrip having a welt portion for facilitating installation of said weatherstrip and a sealing portion Including a seal lip, a support lip opposed to said seal lip and an elongate hollow defined between said seal lip and said support lip, said sealing portion being projected from said welt portion for effecting sealing of an opening on which said weatherstrip is installed, comprising:

inserting said end members to an open mold in a spaced apart relationship such that a gap is present between said end members;

closing said mold so as to apply pressure to said end members such that said support lip is curved inwardly against an inner surface of said seal lip so as to collapse said hollow in the vicinity of said end members, said support lip and said seal lip being compressed to substantially assume the shape of said seal lip portion thereof, a cavity having said shape of said seal lip portion and said welt being formed across said gap to closure of said mold;

injecting a resilient material into said gap for forming a joining member, having an upper sealing connection portion and a lower welt connection portion, connecting said end members, a shape of said upper sealing connection portion of said joining member between sealing portions of each of said end members being substantially that of said seal lip portion of said sealing portion.

2. A method as set forth in claim 1, wherein said welt portion of said weatherstrip is of a first harder resilient material and said sealing portion is of a second softer resilient material, said resilient material injected at said injection step being the same as said first resilient material.

3. A method as set forth in claim 1, wherein said welt portion of said weatherstrip is of a first solid rubber material and said sealing portion is of a second softer sponge rubber material, said resilient material injected at said injection step being the same as said first solid rubber material.

4. A method as set forth in claim 1, wherein a surfaces of said welt are contiguous across said joining member.

5. A method as set forth in claim 1, wherein a step of clamping a position of a tongue portion of said seal lip at each of said end members is carried out prior to said closing step.

6. A method as set forth in claim 1, wherein a step of forming a longitudinal slit communicating with said hollow in said support lip portions proximate each of said end members is carried out prior to said inserting step.

7. A method as set forth in claim 1, further including a step or providing a least one raised rib on said upper sealing connection portion of said joining member, said rib being substantially perpendicular to a longitudinal direction of said weatherstrip.

8. A method as set forth in claim 7, wherein a plurality of said ribs is provided.

9. A method as set forth in claim 7, wherein said joining member and said rib are formed of a solid rubber material.

10. A method as set forth in claim 7, wherein a cross section of said raised rib is triangular.

11. A method as set forth in claim 7, wherein a cross section of said raised rib is semicircular.

12. A method as set forth in claim 7, wherein a cross section of said raised rib is rectangular.

13. An apparatus for joining end members of a weatherstrip comprising:

an upper mold shaped for forming an upper side of a member for connecting said end members of said weatherstrip upper mold including a projection having a predetermined shape disposed over a hollow portion of said weatherstrip;

a lower mold shaped for forming a lower side of said member;

an injection channel for injecting a resilient material forming said joining member;

clamping means for positionally clamping a position of a sealing edge of said weatherstrip prior to closing of said and said upper mold and said lower mold being positionable in a first open condition for receiving end members of said weatherstrip in a spaced apart relation, and a second closed condition to apply pressure to said end members such that said projection causes wall portions defining said hollow portion of said weatherstrip to be curved inwardly together against a surface of said lower mold so as to said hollow portion of said weatherstrip in the vicinity of end members for defining a gap having a predetermined shape between said end members of said weatherstrip and, said further active to assume an intermediate condition between open and said closed condition for effecting clamping of said clamping means.

14. An apparatus as set forth in claim 13, wherein said predetermined shape corresponds to a shape of a seal lip of said weatherstrip.

15. An apparatus as set forth in claim 13, wherein said injection channel is provided in said upper mold.

16. An apparatus as set forth in claim 13, wherein said clamping means comprises a movable block associated with said upper mold, said movable block having a restricting portion formed at a lower side thereof and having a shape corresponding to said sealing edge of said weatherstrip for effecting said clamping.

17. An apparatus as set forth in claim 16, wherein said movable block is mounted on a vertical shaft provided through said upper mold and is biased in a downward direction by a coil spring.

18. An apparatus as set forth in claim 13, wherein a pair of said clamping means is provided on said upper mold so as to positionally clamp a sealing edge of each of said end members respectively.

19. An apparatus as set forth in claim 17, wherein a pair of said clamping means is provided on said upper mold so as to positionally clamp a sealing edge of each of said end members respectively.

20. An apparatus as set forth in claim 18, wherein said injection channel is provided through said upper mold at a position between said pair of clamping means.

* * * * *